(12) United States Patent
Kobayashi

(10) Patent No.: US 11,792,649 B2
(45) Date of Patent: Oct. 17, 2023

(54) RADIO BASE STATION APPARATUS, NON-TRANSITORY COMPUTER READABLE MEDIUM STORING RADIO BASE STATION PROGRAM, AND RADIO COMMUNICATION SYSTEM

(71) Applicant: FUJIFILM Business Innovation Corp., Tokyo (JP)

(72) Inventor: Ayumi Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 378 days.

(21) Appl. No.: 17/075,682

(22) Filed: Oct. 20, 2020

(65) Prior Publication Data
US 2021/0377736 A1 Dec. 2, 2021

(30) Foreign Application Priority Data
May 28, 2020 (JP) .................................. 2020-093636

(51) Int. Cl.
| | |
|---|---|
| *H04W 12/069* | (2021.01) |
| *H04W 76/30* | (2018.01) |
| *H04W 12/03* | (2021.01) |
| *H04W 12/0431* | (2021.01) |

(52) U.S. Cl.
CPC ......... *H04W 12/069* (2021.01); *H04W 12/03* (2021.01); *H04W 12/0431* (2021.01); *H04W 76/30* (2018.02)

(58) Field of Classification Search
CPC ............... H04W 12/069; H04W 76/30; H04W 12/0431; H04W 12/03

USPC ................ 370/329, 328, 338, 341, 345, 350
See application file for complete search history.

(56) References Cited

U.S. PATENT DOCUMENTS

| | | | |
|---|---|---|---|
| 9,660,978 B1* | 5/2017 | Truskovsky | ........ H04L 63/0823 |
| 10,085,267 B2 | 9/2018 | Ueda | |
| 2017/0199751 A1* | 7/2017 | Sama | ..................... H04L 67/10 |

(Continued)

FOREIGN PATENT DOCUMENTS

WO    2015068457    5/2015

*Primary Examiner* — Nghi H Ly
(74) *Attorney, Agent, or Firm* — JCIPRNET

(57) ABSTRACT

A radio base station apparatus includes a processor configured to hold an electronic certificate for a communication carrier and a key pair to be used for authentication of the electronic certificate, for each communication carrier that requests a use of the radio base station apparatus, in a case where a connection request is received from the communication carrier, use the key pair and the electronic certificate for a use communication carrier being the communication carrier that has performed the connection request to authenticate whether or not the use communication carrier is the communication carrier to which a connection to the radio base station apparatus is permitted, and, in a case where an attempt of the authentication succeeds, construct a virtual leased line for connecting the radio base station apparatus with a connection device functioning as an interface with the radio base station apparatus in a communication facility of the use communication carrier, and transfer data in accordance with control from the communication facility of the use communication carrier, the control being performed through the connection device.

18 Claims, 6 Drawing Sheets

(56) References Cited

U.S. PATENT DOCUMENTS

2019/0268310 A1\* 8/2019 Guberman ............ H04L 9/0819
2019/0312863 A1\* 10/2019 Chow ................... H04L 9/0643

\* cited by examiner

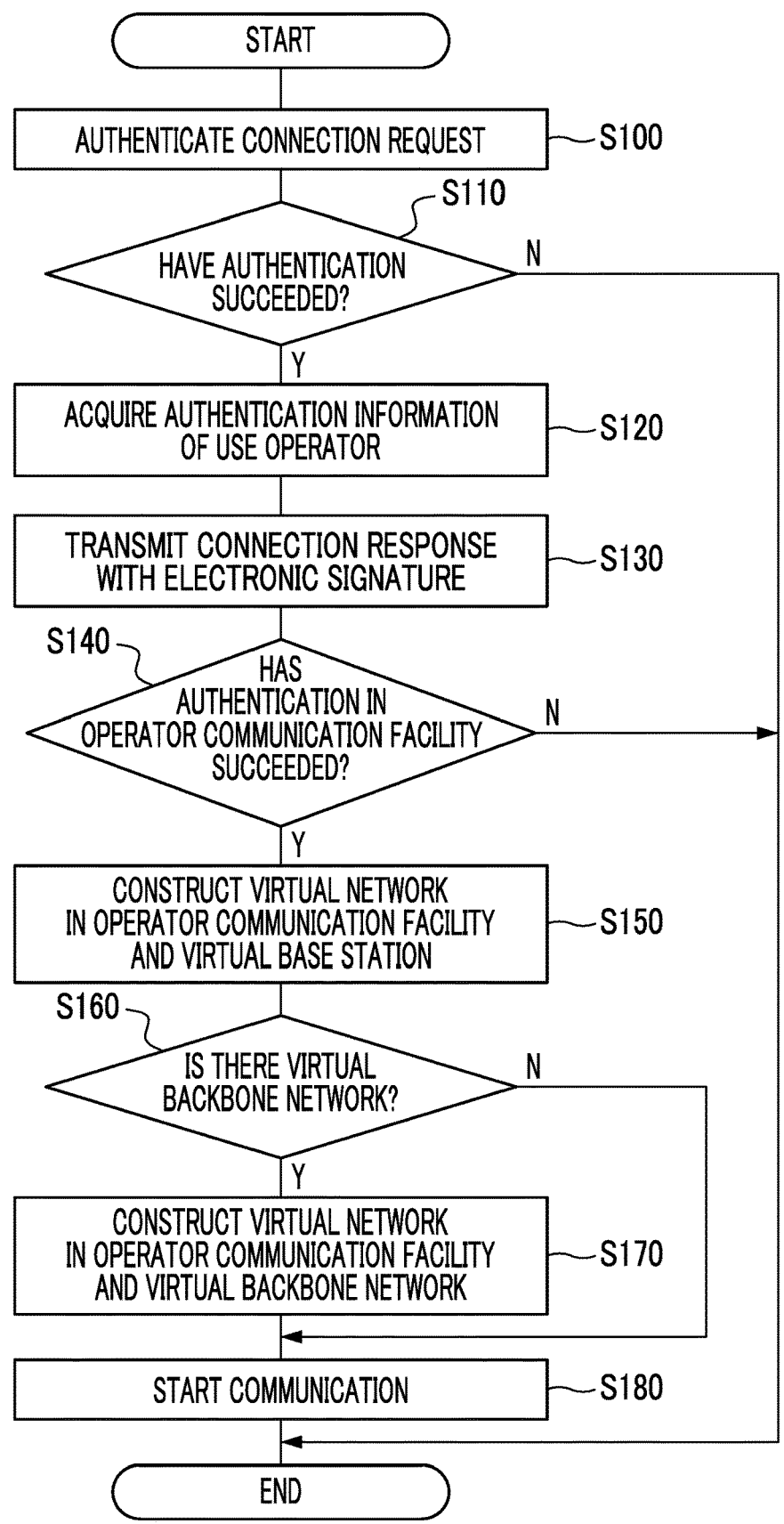

RADIO BASE STATION APPARATUS, NON-TRANSITORY COMPUTER READABLE MEDIUM STORING RADIO BASE STATION PROGRAM, AND RADIO COMMUNICATION SYSTEM

CROSS-REFERENCE TO RELATED APPLICATIONS

This application is based on and claims priority under 35 USC 119 from Japanese Patent Application No. 2020-093636 filed May 28, 2020.

BACKGROUND

(i) Technical Field

The present invention relates to a radio base station apparatus, a non-transitory computer readable medium storing a radio base station program, and a radio communication system.

(ii) Related Art

WO2015/068457A discloses a mobile communication system including a portable terminal, a base station that performs a radio communication with the portable terminal, a gateway device that connects the base station to a core network, and a core network device that is installed on the core network and manages mobility of the mobile terminal. In the mobile communication system, the core network device transmits information for determining whether or not to activate SIPTO to the gateway device, and the gateway device receives the information from the core network device.

SUMMARY

In the fifth generation mobile communication called "5G", communication is performed using a frequency band higher than the frequency band used in the fourth generation mobile communication and the preceding communication. The reach of radio waves becomes shorter as the frequency band used for communication becomes higher. Thus, for example, in a case where a 5G service is intended to be provided in a range identical to an area for providing the service of the fourth generation mobile communication, it is necessary to install more radio base station apparatuses than base station devices of the 4th generation mobile communication.

Thus, providing 5G services is delayed in the suburbs due to the problem of profitability, and there is a concern that regions in which the 5G services are not provided become wide depending on circumstances.

In the areas where the 5G services are not provided, introduction of a local 5G network which is constructed and operated by an organization such as a company or a local government other than a communication carrier, and is enabled to be used only by users in the organization is considered. However, the introduction of the local 5G network needs specialized knowledge about communication, and thus it is difficult for a person who wants to use the 5G service to easily introduce the local 5G network.

Even in urban areas, more radio base station apparatuses than radio base station apparatuses in the fourth generation mobile communication and the preceding communication are needed. However, it is difficult to secure the installation place of the radio base station apparatuses in the urban areas.

The 5G service needs control of a slice network. Thus, in a case of a communication carrier (Virtual Mobile Network Operator: VMNO) that rents a communication line from the communication carrier (Mobile Network Operator: MNO) that constructs the communication line on its own to provide the 5G service, and provides the 5G service at price lower than the price by the MNO, it is difficult to use L2 connection (connection form in the fourth generation mobile communication and the preceding communication) fora connection with the MNO, and network slice is controlled through an application programming interface (API) provided by the MNO. Since the expansion range of the API is determined by the MNO, there is a concern that the influence of the MNO on the 5G service provided by the VMNO may increase.

Under the circumstances as described above, it is expected that a sharing business in which a third party who is neither an MNO nor a VMNO, like a trading company, constructs a radio base station apparatus and provides the constructed radio base station apparatus to be shared and used with the MNO or the VMNO become active in future.

As described above, in a case where the radio base station apparatus is shared by a plurality of communication carriers, it is necessary to secure security such that the radio base station apparatus has a problem by an unauthorized access.

Aspects of non-limiting embodiments of the present disclosure relate to a radio base station apparatus, a non-transitory computer readable medium storing a radio base station program, and a radio communication system, in which, in a case where a plurality of communication carriers uses a radio communication facility shared the plurality of communication carriers to provide radio communication service, it is possible to improve security performance of a radio communication service in comparison to a case of providing a radio communication service without authenticating the communication carrier.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a radio base station apparatus including a processor configured to hold an electronic certificate for a communication carrier and a key pair to be used for authentication of the electronic certificate, for each communication carrier that requests a use of the radio base station apparatus, in a case where a connection request is received from the communication carrier, use the key pair and the electronic certificate for a use communication carrier being the communication carrier that has performed the connection request to authenticate whether or not the use communication carrier is the communication carrier to which a connection to the radio base station apparatus is permitted, and, in a case where an attempt of the authentication succeeds, construct a virtual leased line for connecting the radio base station apparatus with a connection device functioning as an interface with the radio base station apparatus in a communication facility of the use communication carrier, and transfer data in accordance with control from the communication facility of the use communication carrier, the control being performed through the connection device.

BRIEF DESCRIPTION OF THE DRAWINGS

Exemplary embodiment(s) of the present invention will be described in detail based on the following figures, wherein:

FIG. 6 is a flowchart illustrating an example of connection processing of the operator communication facility.

DETAILED DESCRIPTION

Figure 1:
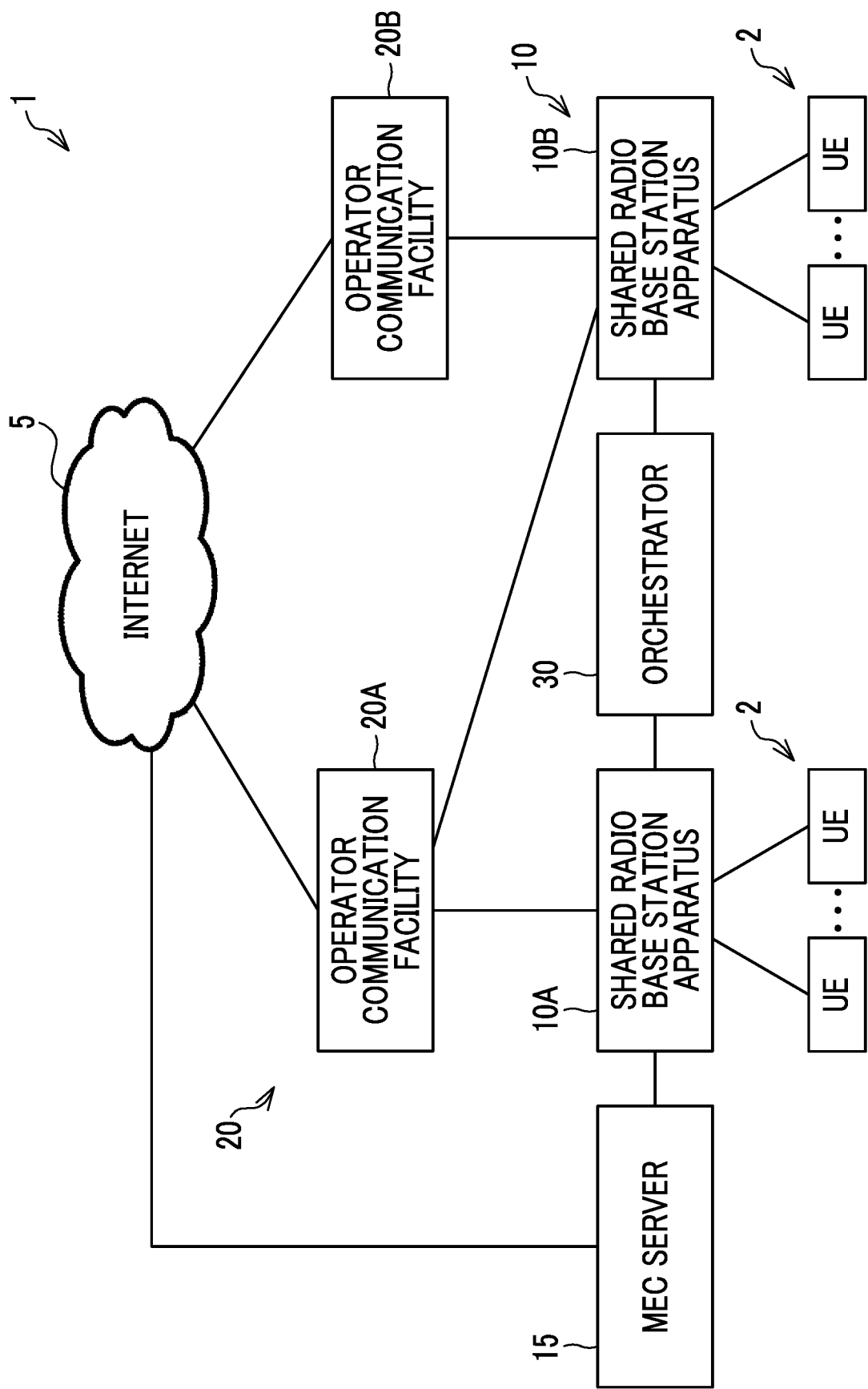
FIG. 1 is a diagram illustrating a system configuration example of a radio communication system.

Hereinafter, an exemplary embodiment of the present invention will be described in detail with reference to the accompanying drawings. The identical components and the identical processes are denoted by the identical reference signs in the drawings, and repetitive description will be omitted.

FIG. 1 is a diagram illustrating a system configuration example of a radio communication system 1 according to an exemplary embodiment. The radio communication system 1 includes a shared radio base station apparatus 10, a MEC server 15, an operator communication facility 20, and an orchestrator 30, which form the fifth-generation mobile communication system (referred to as a "5G system" below). The Internet 5 is connected to each of the MEC server 15 and the operator communication facility 20, and at least one terminal (referred to as a "UE 2" below) used by a user is connected to the shared radio base station apparatus 10.

The shared radio base station apparatus 10 is a radio base station apparatus that supports the 5G communication standard constructed by a third party that is neither an MNO nor a VMNO. The shared radio base station apparatus forms a radio network (Radio Access Network: RAN) that connects the UE 2 by radio. That is, the RAN is a communication line managed by the shared radio base station apparatus 10.

In the example of the radio communication system 1 illustrated in FIG. 1, two shared radio base station apparatuses 10A and 10B are provided. However, there is no limitation on the number of shared radio base station apparatuses 10 in the radio communication system 1, and at least one shared radio base station apparatus 10 may be provided. In a case where it is not necessary to distinguish between the shared radio base station apparatuses 10A and 10B, the shared radio base station apparatuses 10A and 10B are assumed to be referred to as the "shared radio base station apparatus 10", and the shared radio base station apparatus 10 is assumed to be referred to as "the radio base station apparatus 10".

The radio base station apparatus 10 is connected to the communication facilities of at least one MNO and one VMNO that share the RAN provided by the radio base station apparatus 10 to provide the 5G service for the UE 2 being in a radio wave coverage (service area) of the radio base station apparatus 10. For convenience of description, the MNO and the VMNO are referred to as "operators" below. That is, the operator communication facility 20 means a communication facility of an operator connected to the shared radio base station apparatus 10.

In the example of the radio communication system 1 illustrated in FIG. 1, two operator communication facilities 20A and 20B are provided. The operator communication facility 20A is connected to the radio base station apparatuses 10A and 10B, and the operator communication facility 20B is connected to the radio base station apparatus 10B. Similar to the radio base station apparatus 10, in a case where it is not necessary to distinguish between the operator communication facilities 20A and 20B, the operator communication facilities 20A and 20B are assumed to be referred to as the "operator communication facility 20" below.

The operator communication facility 20 is a communication facility that forms a core network (CN) in the 5G system and performs user management and communication control in the 5G system. The operator communication facility 20 is configured by devices used for providing 5G services, such as various exchanges and various subscriber information management devices.

The radio base station apparatus 10 transfers the data received from the UE 2 in accordance with the control of the operator communication facility 20. In a case where a data transfer destination is another UE 2 connected to the identical radio base station apparatus 10, the operator communication facility 20 controls data transfer such that the operator communication facility brings the data received from the UE 2 back to the radio base station apparatus 10, and the radio base station apparatus 10 transfers the data to another UE 2. In a case where the data transfer destination is another UE 2 connected to another radio base station apparatus 10, the operator communication facility 20 receives data from the radio base station apparatus 10, and then transfers the data to another radio base station apparatus 10 connected to the UE 2 as the transfer destination. In a case where the data transfer destination is an external device connected to an external line such as the Internet 5 or a wide area network (WAN) (not illustrated), the operator communication facility 20 receives data from the radio base station apparatus 10, and then transfers the data to the designated external device. As will be described later, in a case where the radio base station apparatus 10 includes a data transfer unit that is connected to an external line and transfers data to the external line, the operator communication facility 20 directly transfers data to an external device from the radio base station apparatus 10 through the data transfer unit.

The orchestrator 30 is connected to the radio base station apparatus 10 and, for example, sets various setting items in the radio base station apparatus 10.

The mobile edge computing (MEC) server 15 is a server installed at a place (edge) which is physically closer to the UE 2 than a cloud server constructed on the Internet 5. Since the MEC server 15 is installed at the place closer to the UE 2 than the cloud server, the MEC server 15 is capable of providing information needed by a user instead of the cloud server. Thus, the ultra-low delay of 1 millisecond or less, which is a feature of the 5G service, and the ultra-wideband data communication of 10 Gbps are realized.

The radio communication system 1 illustrated in FIG. 1 includes the MEC server 15 and the orchestrator 30, but the MEC server 15 and the orchestrator 30 are not necessarily needed for the radio communication system 1 and are installed depending on the situation.

Next, the configuration of the RAN provided by the radio base station apparatus 10 will be described in detail.

Figure 2:
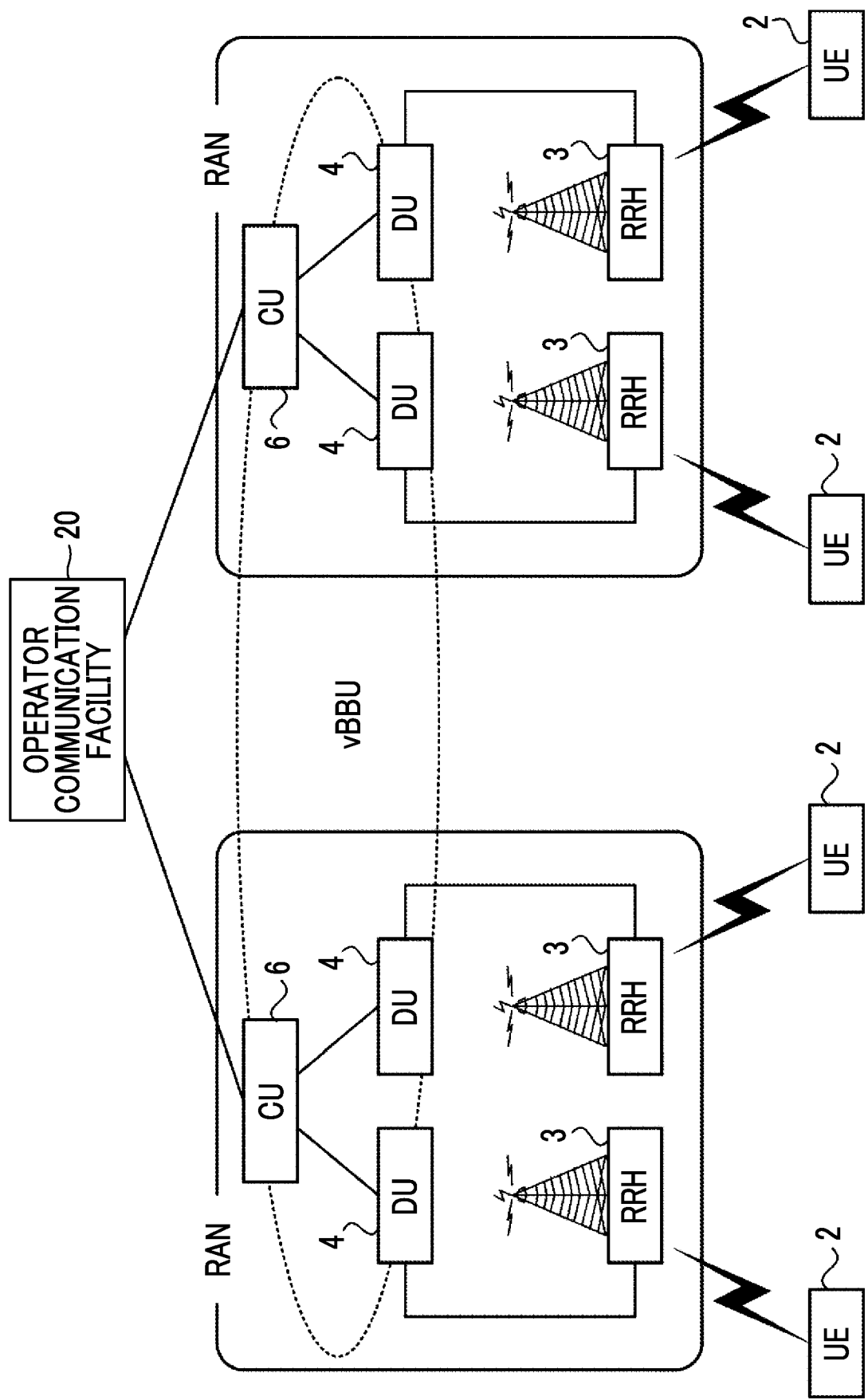
FIG. 2 is a diagram illustrating a configuration example of a RAN.

FIG. 2 is a diagram illustrating a configuration example of the RAN. The RAN is divided into a radio part that actually transmits and receives data, such as a radio antenna, and a control part that controls signal processing of data and transmission and reception of data in the radio part. The control part of the RAN may also be referred to as a virtual base band unit (vBBU).

In order to provide 5G services in a wide range with a smaller number of antennas, for example, a large radio antenna may be installed. At a place where radio waves are hard to reach even in a 5G service area or UEs 2 are easily crowded, for example, a large number of small radio antennas may be arranged. As described above, for example, the appropriate installation form of the radio antenna differs depending on the place. Thus, the radio part and the control part of the RAN are independent from each other to secure the degree of freedom of the installation form of the radio antenna.

The radio part of the RAN is configured by a remote radio head (RRH) 3, and the vBBU is configured by a distributed unit (DU) 4 and a centralized unit (CU) 6. The vBBU is connected to the RRH 3 to perform, for example, a MAC layer process of performing radio resource allocation, data mapping, and the like, an RLC layer process of performing retransmission control, and the like, and a PDCP layer process of performing data header compression, order alignment, and the like.

The CU 6 is connected to at least one DU 4, and a communication with the UE 2 is performed via the DU 4. Thus, the DU 4 may be referred to as a distributed node, and the CU 6 may be referred to as an aggregation node. The RAN is connected to the operator communication facility 20 via the CU 6. The MEC server 15 and the orchestrator 30 are also connected to the CU 6. The radio base station apparatus 10 may include a plurality of RANs.

Next, the functional configuration example of the radio base station apparatus 10 and the operator communication facility 20 will be described.

Figure 3:
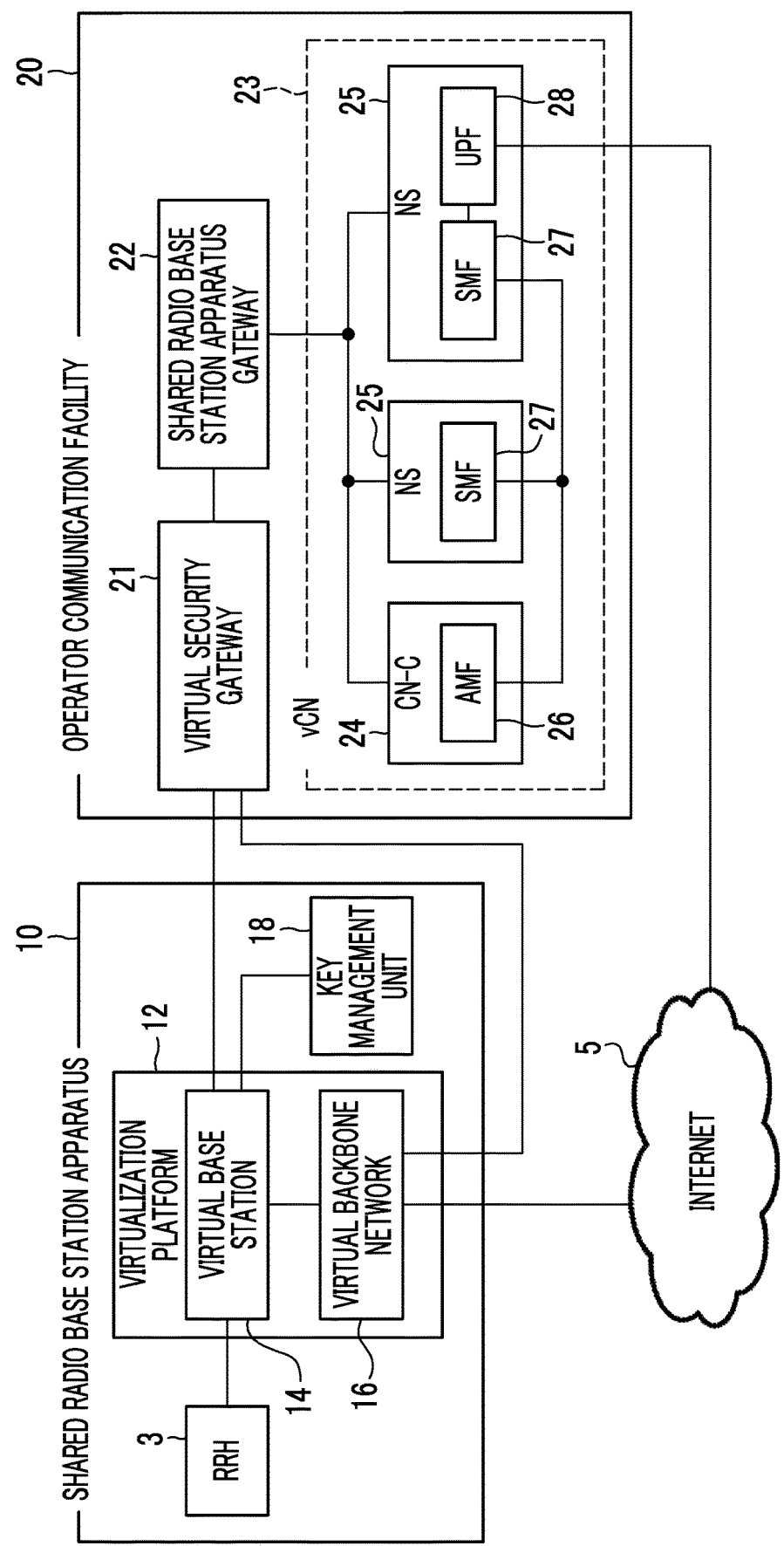
FIG. 3 is a diagram illustrating a functional configuration example of a radio base station apparatus and an operator communication facility.

FIG. 3 is a diagram illustrating the functional configuration example of the radio base station apparatus 10 and the operator communication facility 20. The radio base station apparatus 10 includes at least one RRH 3, a virtual base station 14 that functions as a vBBU, a virtual backbone network 16 that transfers data to an external line, and a key management unit 18.

Both the virtual base station 14 and the virtual backbone network 16 among the above components are constructed on the virtualization platform 12. The virtualization platform 12 refers to an operating environment of software provided by each of a plurality of virtual servers generated on one physical server by virtualization software. That is, the virtual base station 14 and the virtual backbone network 16 are realized by software processing.

Since the virtual base station 14 and the virtual backbone network 16 are constructed on the virtualization platform 12, for example, even though a problem occurs in the virtual base station 14 and the virtual backbone network 16 constructed on a specific virtualization platform 12, only the virtualization platform 12 including the virtual base station 14 and the virtual backbone network 16 having a problem may be stopped, and then a recovery work may be performed without an influence on the operation of the virtual base station 14 or the virtual backbone network 16 constructed on another virtualization platform 12 in which no problem has occurred.

The virtual base station 14 is connected to the RRH 3, the virtual backbone network 16, and the key management unit 18. In a case where the virtual base station 14 receives a connection request from the operator communication facility 20, the virtual base station 14 performs the authentication of the operator communication facility 20 that has performed the connection request, in cooperation with the key management unit 18. As a result of the authentication, in a case where the operator communication facility 20 that has performed the connection request is determined to be an operator communication facility 20 (referred to as a "registered operator communication facility 20" below) that is permitted to be connected to the radio base station apparatus 10 in advance, the virtual base station 14 constructs a virtual network that connects the virtual base station 14 and the operator communication facility 20 that has performed the connection request, to each other. In this state, the virtual base station 14 performs a transfer process of the data received from the UE 2 in accordance with the control from the operator communication facility 20, which is performed via the virtual network.

As described above, the radio base station apparatus 10 realizes the authentication of the operator communication facility 20, the control of the radio base station apparatus 10, that is, the own device, and the data transfer, on the virtualization platform 12 configured by software. Among a plurality of operators, the operator who has transmitted the connection request to the radio base station apparatus 10 is an example of the use communication carrier according to the exemplary embodiment.

In the radio base station apparatus 10, in order to ensure the security associated with the connection between the radio base station apparatus 10 and the operator communication facility 20, the radio base station apparatus 10 and the operator communication facility 20 perform mutual authentication using an electronic certificate.

The key management unit 18 holds authentication information used in a case where the mutual authentication is performed between the radio base station apparatus 10 and the operator communication facility 20. The authentication information includes, for example, a public land mobile network (PLMN), an electronic certificate, and a private key and a public key of the electronic certificate. The key management unit 18 holds the authentication information for each operator who permits a connection to the radio base station apparatus 10. That is, the key management unit 18 associates the PLMN, the electronic certificate, and the private key and public key of the electronic certificate with each other for each operator, and holds the associated information group as the authentication information.

Here, the PLMN means a company code for uniquely identifying an operator, and is assigned to each operator by the country. The PLMN is configured by a mobile country code (MMC) and a mobile network code (MNC). The MMC represents the country as a registration destination of an operator providing the mobile communication service, and the MNC represents the operator. The private key of the electronic certificate and the public key paired with the private key of the electronic certificate are collectively referred to as a "key pair" below.

Differing from the virtual base station 14 and the virtual backbone network 16, the key management unit 18 is constructed by dedicated hardware separated from the virtualization platform 12 and holds the authentication information. For example, a storage device that holds the authentication information may have robust security such that the authentication information does not leak to the outside of the radio base station apparatus 10. Thus, the radio base station apparatus 10 holds the authentication information in a hardware cryptographic module (Hardware Security Module: HSM) 50 described later.

The virtual backbone network 16 is an example of the data transfer unit that is connected to the Internet 5 as an example of the external line, and transfers data received from the UE 2 to an external device connected to the Internet 5 in accordance with the control of the operator communication facility 20. The virtual backbone network 16 is not necessarily included in each the radio base station apparatus 10, and is provided only in the radio base station apparatus 10 having a configuration for directly transferring data from the radio base station apparatus 10 to the Internet 5.

The data transfer control in the virtual backbone network 16 is performed from the operator communication facility 20 not via the virtual network that connects the operator communication facility 20 and the virtual base station 14 to each other, but via the virtual network that connects the operator communication facility 20 and the virtual backbone network 16 to each other. That is, in a case where the radio base station apparatus 10 includes the virtual backbone network 16, two virtual networks being a virtual network that connects the operator communication facility 20 and the virtual base station 14 to each other and a virtual network that connects the operator communication facility 20 and the virtual backbone network 16 to each other are constructed between the radio base station apparatus 10 and the operator communication facility 20.

In addition to the Internet 5, the virtual backbone network 16 may be connected to a software defined wide area network (SDWAN) as an example of the external line. The SDWAN refers to a wide area network in which central management through software is enabled, and secure data is transferred between sites in accordance with a transfer policy.

The operator communication facility 20 includes a virtual security gateway 21, a shared radio base station apparatus gateway 22, and a virtual core network (vCN) 23 that is a virtualized CN.

The virtual security gateway 21 is installed for each radio base station apparatus 10 as a connection destination, and functions as an interface of the operator communication facility 20 to the radio base station apparatus 10. Therefore, the virtual security gateway 21 authenticates the radio base station apparatus 10 using the electronic certificate, and, in a case where the authentication is successful, a virtual network is constructed between the virtual security gateway 21 and the radio base station apparatus 10. Thus, the virtual security gateway 21 is an example of a connection device that connects the radio base station apparatus 10 and the operator communication facility 20 to each other.

In order to perform the authentication using the electronic certificate, the virtual security gateway 21 also holds the authentication information of each radio base station apparatus 10, similar to the radio base station apparatus 10. In the authentication information held by the operator communication facility 20, a radio base station apparatus ID for uniquely identifying the radio base station apparatus 10 is associated with the electronic certificate and the key pair of the electronic certificate, instead of the PLMN.

The shared radio base station apparatus gateway 22 is connected to the virtual security gateway 21 and the vCN 23, and relays data between the RAN of the radio base station apparatus 10 and the vCN 23.

The vCN 23 performs data communication control and user management for managing information regarding a user who uses the UE 2, such as the location of the UE 2 that uses the 5G service and billing information. The vCN 23 is configured by a CN-C 24 and a network slice (NS) 25.

The CN-C 24 is a functional unit that performs communication control of the 5G network, and includes an access and mobility management function (AMF) 26 that performs mobility management such as authentication of the UE 2 and the position management of the UE 2.

The NS 25 refers to a divided network (slice) constructed on a 5G network between the UE 2 and the vCN 23 by a combination of the divided virtual resources. The virtual resources are obtained by dividing resources such as processing capacity of the facility (such as a memory and a router) and a network bandwidth used for providing 5G services. Each NS 25 includes a session management function (SMF) 27.

The SMF 27 is a functional unit that manages the session of the NS 25 and assigns an IP address to the UE 2, in accordance with an instruction of the AMF 26. The SMF 27 selects a user plane function (UPF) 28 and controls the UPF 28 to transfer data using the NS 25. In a case where the data transfer destination is an external device, the SMF 27 transfers the data to the Internet 5 through the UPF 28.

Next, the basic configuration example of an electrical system in the radio base station apparatus 10 will be described.

Figure 4:
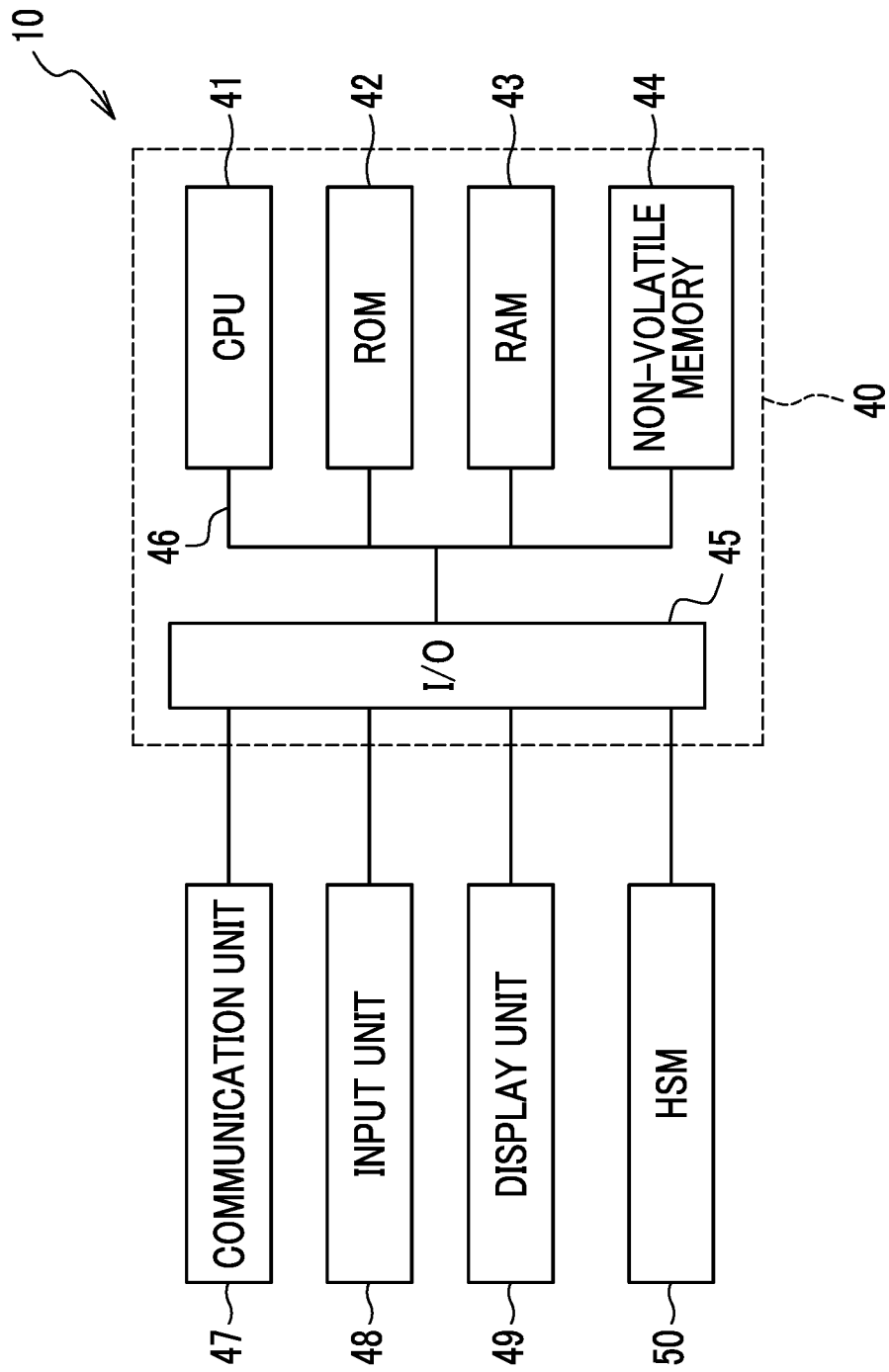
FIG. 4 is a diagram illustrating a basic configuration example of an electrical system in the radio base station apparatus.

FIG. 4 is a diagram illustrating the basic configuration example of the electrical system in the radio base station apparatus 10. The radio base station apparatus 10 is configured, for example, by using a computer 40 such as a blade server, and at least one virtualization platform 12 is constructed on the computer 40.

The computer 40 includes a central processing unit (CPU) 41, a read only memory (ROM) 42, a random access memory (RAM) 43, a non-volatile memory 44, and an input and output interface (I/O) 45. The CPU 41 performs processing of each functional unit of the radio base station apparatus 10 illustrated in FIG. 3. The ROM 42 stores a radio base station program causing the computer 40 to function as the radio base station apparatus 10. The RAM 43 is used as a temporary work area of the CPU 41. The CPU 41, the ROM 42, the RAM 43, the non-volatile memory 44, and the I/O 45 are connected to each other via a bus 46.

The non-volatile memory 44 is an example of a storage device that retains stored information even though power supplied to the non-volatile memory 44 is cut off. As the non-volatile memory, for example, a semiconductor memory is used, and a hard disk may be used. Information that needs to be stored even though the power of the radio base station apparatus 10 is cut off is stored in the non-volatile memory 44.

The non-volatile memory 44 does not necessarily need to be mounted in the computer 40, and may be a portable storage device capable of being attached and detached to and from the computer 40, for example.

Devices such as a communication unit 47, an input unit 48, a display unit 49, and an HSM 50 are connected to the I/O 45.

The communication unit 47 is connected to the RRH 3 and also to the Internet 5 in a case where the virtual backbone network 16 is provided. The communication unit has a communication protocol for performing data communication with the UE 2 and an external device connected to the Internet 5.

The input unit 48 is a device that receives a user instruction and notifies the CPU 41, and, for example, a button, a touch panel, a keyboard, a mouse, or the like is used. In a case where the input unit receives an instruction by voice, a microphone may be used as the input unit 48.

The display unit 49 is an example of a device that visually displays information processed by the CPU 41, and, for example, a liquid crystal display, an organic electro luminescence (EL) display, or the like is used.

The HSM 50 is dedicated hardware that includes a semiconductor chip that stores authentication information and prevents leakage of the authentication information by rejecting an unauthorized access from the outside. The package of the HSM 50 is integrally molded. For example, even though the HSM 50 is forcibly opened and the semiconductor chip is taken out in an attempt to illegally acquire the authentication information, a process of preventing the leakage of the authentication information by destroying the components necessary for reading the authentication information. The HSM 50 also has a function of generating a true random number and generates a private key and a public key of an electronic certificate.

Each virtualization platform 12 may include a different communication unit 47, a different input unit 48, a different display unit 49, and a different HSM 50. However, the identical communication unit 47, the identical input unit 48, the identical display unit 49, and the identical HSM 50 may be commonly assigned to the virtualization platforms 12.

The device connected to the I/O 45 is an example. As necessary, a device different from the device illustrated in FIG. 4, such as an image forming unit that forms an image on a recording medium such as paper may be connected to I/O 45. In a case where the radio base station apparatus 10 is installed in an unmanned place, the input unit 48 and the display unit 49 are not necessarily needed. In this case, the radio base station apparatus 10 may receive a user instruction through the communication unit 47, and transmit information intended to be displayed on the display unit 49 by the radio base station apparatus 10 to an external device such as the orchestrator 30 through the communication unit 47 such that the information is displayed in the external device.

Next, registration processing of the operator communication facility 20 in the radio base station apparatus 10 will be described. In order for the operator communication facility 20 to use the radio base station apparatus 10, it is necessary to register the operator communication facility 20 in advance in the radio base station apparatus 10 to be used. Such registration of the operator communication facility 20 in the radio base station apparatus 10 is performed in response to a registration request from the operator communication facility 20.

Figure 5:
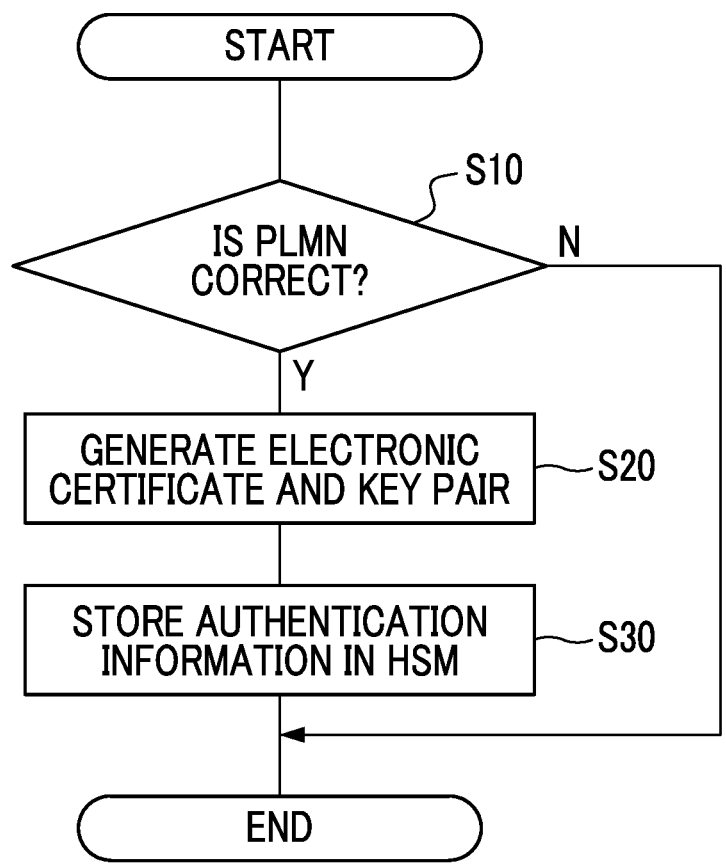
FIG. 5 is a flowchart illustrating an example of registration processing of the operator communication facility.

FIG. 5 is a flowchart illustrating an example of registration processing of the operator communication facility 20, which is performed by the CPU 41 of the radio base station apparatus 10 in a case where a registration request is received from the operator communication facility 20.

A radio base station program of defining the registration processing of the operator communication facility 20 is stored in advance in the ROM 42 of the radio base station apparatus 10, for example. The CPU 41 of the radio base station apparatus 10 reads the radio base station program stored in the ROM 42 and performs the registration processing of the operator communication facility 20.

In Step S10, the CPU 41 determines whether or not the PLMN included in the received registration request is a correct PLMN. The correct PLMN means that the PLMN is a formal PLMN assigned by the country. A method of determining whether or not the PLMN is the correct PLMN is not limited to a determination of whether or not the PLMN is a formal PLMN assigned by the country. For example, the PLMN of an operator who permits the use of the radio base station apparatus 10 is set in advance in the non-volatile memory 44. Then, in a case where the PLMN included in the registration request coincides with the PLMN of any operator who permits the use of the radio base station apparatus 10, the CPU may determine that the PLMN included in the registration request is the correct PLMN.

In a case where the PLMN included in the registration request is not the correct PLMN, it is considered that the registration request is an unauthorized request. Thus, the registration processing of the operator communication facility 20 illustrated in FIG. 5 is ended, and the registration of the operator communication facility 20 is not performed.

In a case where the PLMN included in the registration request is the correct PLMN, the process proceeds to Step S20.

In Step S20, the CPU 41 generates an electronic certificate and a key pair for the operator who has performed the registration request (registered operator). Specifically, the CPU 41 requests a certificate authority to issue an electronic certificate through an external line, and acquires the electronic certificate for the registered operator from the certificate authority. The CPU 41 uses the true random number generation function of the HSM 50 to generate a key pair for the issued electronic certificate.

In Step S30, the CPU 41 associates the PLMN of the registered operator with the electronic certificate and key pair acquired in Step S20 to generate authentication information. The CPU stores the generated authentication information of the registered operator in the HSM 50, and then ends the registration processing of the operator communication facility 20 illustrated in FIG. 5. As described above, the authentication information of the registered operator is registered in the HSM 50. The registration processing of the operator communication facility 20 is performed for each radio base station apparatus 10.

An operator who wants to provide 5G services to a user by using the RAN of a radio base station apparatus 10 transmits a connection request from the operator communication facility 20 to the radio base station apparatus 10 that provides the RAN that the user wants to use.

FIG. 6 is a flowchart illustrating an example of connection processing of the operator communication facility 20 performed by the CPU 41 of the radio base station apparatus 10 in a case where a connection request is received from the operator communication facility 20.

The connection processing of the operator communication facility 20 is also defined in the radio base station program, similar to the registration processing of the operator communication facility 20. The CPU 41 of the radio base station apparatus 10 reads the radio base station program stored in the ROM 42 and performs the connection processing of the operator communication facility 20.

The connection request includes the PLMN of an operator (referred to as a "use operator" below) who has performed the connection request, an electronic certificate that is acquired by the use operator for each radio base station apparatus 10 as a connection destination and includes a public key, and an electronic signature. The electronic signature refers to encrypted data obtained by encrypting a hash value of the connection request with a private key associated with the electronic certificate. The hash value is calculated using a hash function. For convenience of the description, the electronic certificate which is acquired by the operator and is included in the connection request is referred to as an "operator electronic certificate" and is distinguished from an electronic certificate for each operator registered in the radio base station apparatus 10. The use operator is an example of the use communication carrier according to the exemplary embodiment.

In Step S100, the CPU 41 authenticates whether the received connection request is a correct connection request from a registered operator whose authentication information has already been registered in the HSM 50. That is, the CPU 41 authenticates whether the authentication information including the PLMN included in the connection request is provided in the HSM 50, and whether the use operator who has performed the connection request is identical to an operator represented by the PLMN.

Whether or not the use operator is identical to the operator represented by the PLMN included in the connection request is checked using the operator electronic certificate. Specifically, the CPU 41 calculates a decryption hash value obtained by decrypting the electronic signature given to the connection request with the public key of the operator electronic certificate. Then, the CPU determines whether the decryption hash value is equal to the hash value of the connection request, which is calculated using the hash function. In a case where the decryption hash value is equal to the hash value calculated from the connection request, the CPU 41 further checks whether the operator electronic certificate is issued by the valid certificate authority, by following an authentication path of the operator electronic certificate, to check that there is no spoofing.

In Step S110, the CPU 41 determines whether or not the authentication of the connection request has succeeded. In a case where the authentication of the connection request has failed, it is considered that the received connection request is an unauthorized connection request whose request source is unclear. Thus, the CPU rejects the connection and ends the connection processing of the operator communication facility 20 illustrated in FIG. 6. In a case where the authentication of the connection request has succeeded, the process proceeds to Step S120.

The radio base station apparatus 10 transmits a connection response with an electronic signature to the virtual security gateway 21 of the operator communication facility 20 being a transmission source of the connection request, such that the operator communication facility 20 can check that the radio base station apparatus 10 intended to be connected by the operator communication facility 20 is a correct connection destination.

Therefore, firstly, in Step S120, the CPU 41 acquires, from the HSM 50, the authentication information including the PLMN included in the connection request, that is, the authentication information of the use operator.

In Step S130, the CPU 41 encrypts the hash value of the connection response, which is calculated using the hash function, with the private key of the authentication information acquired in Step S120 to generate an electronic signature. In this state, the CPU 41 adds the public key associated with the electronic certificate to the electronic certificate included in the authentication information of the use operator, and generates a connection response including the generated electronic signature and the electronic certificate to which the public key is added. The CPU 41 transmits the connection response generated in this manner to the virtual security gateway 21 of the operator communication facility 20 as the transmission source of the connection request.

In Step S140, the CPU 41 determines whether or not the virtual security gateway 21 of the operator communication facility 20 that has transmitted the connection response has succeeded in authenticating the connection response. The CPU 41 detects whether or not the virtual security gateway 21 has succeeded in authenticating the connection response, based on the authentication result from the virtual security gateway 21 or the state of the communication session used for transmitting the connection response. In a case where the virtual security gateway 21 has failed in authenticating the connection response, the communication session is forcibly disconnected.

As described above, since the virtual security gateway 21 also authenticates the radio base station apparatus 10, for example, an invalid event in which the CPU 41 performs the connection response to an operator communication facility 20 that actually has not performed the connection request, in response to an unauthorized connection request, may be detected.

Thus, in a case where it is determined that the virtual security gateway 21 has failed in authenticating the connection response from the radio base station apparatus 10, the CPU ends the connection processing of the operator communication facility 20 illustrated in FIG. 6.

In a case where it is determined that the virtual security gateway 21 has succeeded in authenticating the connection response from the radio base station apparatus 10, it is authenticated that the radio base station apparatus 10 and the operator communication facility 20 are correctly connected to each other. Then, the process proceeds to Step S150.

In Step S150, the CPU 41 performs a virtual private network (VPN) connection to the virtual security gateway 21 in the operator communication facility 20 of the use operator to construct a virtual network being an example of a virtual leased line securing confidentiality of data by encryption and tunneling between the CPU and the virtual base station 14. Specifically, the CPU 41 uses, for example, IKEv2 as a VPN protocol and uses IPsec (IP Security) as a data encryption protocol to establish a tunnel with the virtual security gateway 21 and construct a virtual network in the tunnel. The virtual network is realized as an overlay network using a virtual extensible local area network (VXLAN), for example.

In Step S160, the CPU 41 determines whether or not the virtual backbone network 16 is connected to the virtual base station 14 that constructs a virtual network with the virtual security gateway 21 in Step S150. In a case where the virtual backbone network 16 is connected, the process proceeds to Step S170.

In a case where the virtual backbone network 16 is connected to the virtual base station 14, routing in which data received from the UE 2 is directly transferred to an external line such as the Internet 5 from the radio base station apparatus 10 without passing through the operator communication facility 20 is possible. The routing is performed in accordance with the control of the operator communication facility 20. Thus, in Step S170, the CPU 41 performs the VPN connection to the virtual security gateway 21 in the operator communication facility 20 of the use operator and constructs a virtual network with the virtual backbone network 16, by a method similar to that in Step S150.

In a case where the virtual backbone network 16 is not connected to the virtual base station 14, the process proceeds to Step S180 without performing the process of Step S170.

In Step S180, the CPU 41 starts communication with the virtual security gateway 21 in the operator communication facility 20 of the use operator, and transfers the data received from the UE 2 in accordance with the control performed via the virtual network by the virtual security gateway 21. With the above description, the connection processing of the operator communication facility 20 illustrated in FIG. 6 is ended.

The number of operators to which one radio base station apparatus 10 simultaneously permits the connection is not limited to one. In a case where the connection request is received from a plurality of operators, the connection processing of the operator communication facility 20 illustrated in FIG. 6 is performed for each operator, and data received from the UE 2 is transferred in accordance with the control from each operator communication facility 20 connected by the virtual network. That is, the plurality of operators share the identical radio base station apparatus 10 and provide 5G services.

In the connection processing of the operator communication facility 20 illustrated in FIG. 6, in a case where the radio base station apparatus receives the connection request from the operator communication facility 20, the radio base station apparatus 10 constructs a virtual network with the operator communication facility 20.

In a case where any problem occurs in the radio base station apparatus 10, and thus the radio base station apparatus 10 as the subject cuts off the virtual network with the operator communication facility 20, the operator communication facility 20 continuously transmits the connection request, for example, until the radio base station apparatus 10 is restored by an attempt to reconnect with the radio base station apparatus 10.

Thus, in a case where the radio base station apparatus 10 cuts off the connection with the virtual security gateway 21 in the operator communication facility 20 due to a problem caused by the radio base station apparatus, after the problem is recovered, the connection request is performed to the operator communication facility 20 that has cut off the virtual network from the radio base station apparatus 10. In this state, the radio base station apparatus 10 authenticates the connection response transmitted from the operator communication facility 20 using an electronic certificate. In a case where it is authenticated that the radio base station apparatus 10 and the operator communication facility 20 are correctly connected to each other, the radio base station apparatus reconstructs the virtual network.

In the above description, the connection processing between the radio base station apparatus 10 and the operator communication facility 20 in a case where the radio base station apparatus 10 is shared has been described by using, as an example, the radio communication system 1 that provides the 5G system. The connection processing between the radio base station apparatus 10 and the operator communication facility 20, according to the exemplary embodiment, may be applied to a communication system other than the 5G system, such as the fourth generation mobile communication system or a communication system of the sixth generation mobile communication system or later, which is considered to be introduced in the future.

The present invention has been described above using the exemplary embodiment, but the present invention is not limited to the scope described in the exemplary embodiment. Various modifications and improvements can be added to the exemplary embodiment without departing from the scope of the present invention, and exemplary embodiments to which the modifications or improvements are added are also included in the technical scope of the present invention. For example, the order of processing may be changed without departing from the scope of the present invention.

In addition, in the exemplary embodiment, as an example, the form in which the registration processing and the connection processing of the operator communication facility 20 are realized by software has been described. However, processing equivalent to the flowcharts illustrated in FIGS. 5 and 6 maybe mounted, for example, on an application specific integrated circuit (ASIC), a field programmable gate array (FPGA), or a programmable logic device (PLD) and processed by hardware. In this case, the processing speed can be increased in comparison to a case where the registration processing and the connection processing of the operator communication facility 20 are realized by software.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above-described exemplary embodiment, the form in which the radio base station program is installed on the ROM 42 has been described, but the present invention is not limited thereto. The radio base station program according to the exemplary embodiment can be provided in a form of being recorded in a storage medium readable by the computer 40. For example, the radio base station program may be provided in a form of being recorded on an optical disc such as a CD (Compact Disc)-ROM or a DVD (Digital Versatile Disc)-ROM. The radio base station program according to the exemplary embodiment may be provided in a form of being recorded in a portable semiconductor memory such as a universal serial bus (USB) memory or a memory card.

Furthermore, the radio base station apparatus 10 may acquire the radio base station program from an external device via an external line such as the Internet 5.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A radio base station apparatus comprising:
   a processor configured to
      hold an electronic certificate for a communication carrier and a key pair to be used for authentication of the electronic certificate, for each communication carrier that requests a use of the radio base station apparatus, in a case where a connection request is received from the communication carrier, use the key pair and the electronic certificate for a use communication carrier being the communication carrier that has performed the connection request to authenticate whether or not the use communication carrier is the communication carrier to which a connection to the radio base station apparatus is permitted, and in a case where an attempt of the authentication succeeds, construct a virtual leased line for connecting the radio base station apparatus with a connection device functioning as an interface with the radio base station apparatus in a communication facility of the use communication carrier, and transfer data in accordance with control from the communication facility of the use communication carrier, the control being performed through the connection device.

2. The radio base station apparatus according to claim 1, wherein the processor is configured to, in a case where a data transfer unit configured to transfer data to an external line different from a communication line that is managed by the radio base station apparatus is provided, further construct a virtual leased line for connecting the data transfer unit and the connection device.

3. The radio base station apparatus according to claim 1, wherein the authentication of the use communication carrier, control of the radio base station apparatus, and data transfer are implemented on a virtualization platform configured by software, and the key pair and the electronic certificate of each communication carrier are held by dedicated hardware that holds the electronic certificate and the key pair, the dedicated hardware being separate from the virtualization platform.

4. The radio base station apparatus according to claim 2, wherein the authentication of the use communication carrier, control of the radio base station apparatus, and data transfer are performed on a virtualization platform configured by software, and the key pair and the electronic certificate of each communication carrier are held by dedicated hardware that holds the electronic certificate and the key pair, the dedicated hardware being separate from the virtualization platform.

5. The radio base station apparatus according to claim 1, wherein the processor is configured to perform the authentication for each communication carrier in a case where a connection request is received from a plurality of communication carriers, and construct a virtual leased line for connecting the connection device of the communication carrier that has succeeded in the authentication to the radio base station apparatus and transfer data in accordance with control from communication facilities of the plurality of communication carriers, which is performed through each connection device.

6. The radio base station apparatus according to claim 2, wherein the processor is configured to perform the authentication for each communication carrier in a case where a connection request is received from a plurality of communication carriers, and construct a virtual leased line for connecting the connection device of the communication carrier that has succeeded in the authentication to the radio base station apparatus and transfer data in accordance with control from communication facilities of the plurality of communication carriers, which is performed through each connection device.

7. The radio base station apparatus according to claim 3, wherein the processor is configured to perform the authentication for each communication carrier in a case where a connection request is received from a plurality of communication carriers, and construct a virtual leased line for connecting the connection device of the communication carrier that has succeeded in the authentication to the radio base station apparatus and transfer data in accordance with control from communication facilities of the plurality of communication carriers, which is performed through each connection device.

8. The radio base station apparatus according to claim 4, wherein the processor is configured to perform the authentication for each communication carrier in a case where a connection request is received from a plurality of communication carriers, and construct a virtual leased line for connecting the connection device of the communication carrier that has succeeded in the authentication to the radio base station apparatus and transfer data in accordance with control from communication facilities of the plurality of communication carriers, which is performed through each connection device.

9. The radio base station apparatus according to claim 1, wherein the processor is configured to perform a connection request from the radio base station apparatus to a connection device that has disconnected a connection, in a case where the connection to the connection device is disconnected by a problem caused by the radio base station apparatus.

10. The radio base station apparatus according to claim 2, wherein the processor is configured to perform a connection request from the radio base station apparatus to a connection device that has disconnected a connection, in a case where the connection to the connection device is disconnected by a problem caused by the radio base station apparatus.

11. The radio base station apparatus according to claim 3, wherein the processor is configured to perform a connection request from the radio base station apparatus to a connection device that has disconnected a connection, in a case where the connection to the connection device is disconnected by a problem caused by the radio base station apparatus.

12. The radio base station apparatus according to claim 4, wherein the processor is configured to perform a connection request from the radio base station apparatus to a connection device that has disconnected a connection, in a case where the connection to the connection device is disconnected by a problem caused by the radio base station apparatus.

13. The radio base station apparatus according to claim 5, wherein the processor is configured to perform a connection request from the radio base station apparatus to a connection device that has disconnected a connection, in a case where the connection to the connection device is disconnected by a problem caused by the radio base station apparatus.

14. The radio base station apparatus according to claim 6, wherein the processor is configured to perform a connection request from the radio base station apparatus to a connection device that has disconnected a connection, in a case where the connection to the connection device is disconnected by a problem caused by the radio base station apparatus.

15. The radio base station apparatus according to claim 7, wherein the processor is configured to perform a connection request from the radio base station apparatus to a connection device that has disconnected a connection, in a case where the connection to the connection device is disconnected by a problem caused by the radio base station apparatus.

16. The radio base station apparatus according to claim 8, wherein the processor is configured to perform a connection request from the radio base station apparatus to a connection device that has disconnected a connection, in a case where the connection to the connection device is disconnected by a problem caused by the radio base station apparatus.

17. A non-transitory computer readable medium storing a radio base station program causing a computer to execute a process, the process comprising:

holding an electronic certificate for a communication carrier and a key pair to be used for authentication of the electronic certificate, for each communication carrier that requests a use of the radio base station apparatus;

in a case where a connection request is received from the communication carrier, using the key pair and the electronic certificate for a use communication carrier being the communication carrier that has performed the connection request to authenticate whether or not the use communication carrier is the communication carrier to which a connection to the radio base station apparatus is permitted; and in a case where an attempt of the authentication succeeds, constructing a virtual leased line for connecting the radio base station apparatus with a connection device functioning as an interface with the radio base station apparatus in a communication facility of the use communication carrier, and transferring data in accordance with control from the communication facility of the use communication carrier, the control being performed through the connection device.

18. A radio communication system comprising:

a radio base station apparatus that holds an electronic certificate for a communication carrier and a key pair to be used for authentication of the electronic certificate, for each communication carrier that requests a use of the radio base station apparatus, in a case where a connection request is received from the communication carrier, uses the key pair and the electronic certificate for a use communication carrier being the communication carrier that has performed the connection request to authenticate whether or not the use communication carrier is the communication carrier to which a connection to the radio base station apparatus is permitted, and, in a case where an attempt of the authentication succeeds, constructs a virtual leased line for connecting the radio base station apparatus with a connection device functioning as an interface with the radio base station apparatus in a communication facility of the use communication carrier, and transfers data in accordance with control from the communication facility of the use communication carrier, the control being performed through the connection device; and the communication facility of the communication carrier, which includes the connection device connected to the radio base station apparatus by the virtual leased line.

\* \* \* \* \*